Sept. 25, 1945. R. C. HAWKINS 2,385,514
BARREL TRUCK
Filed Feb. 7, 1944
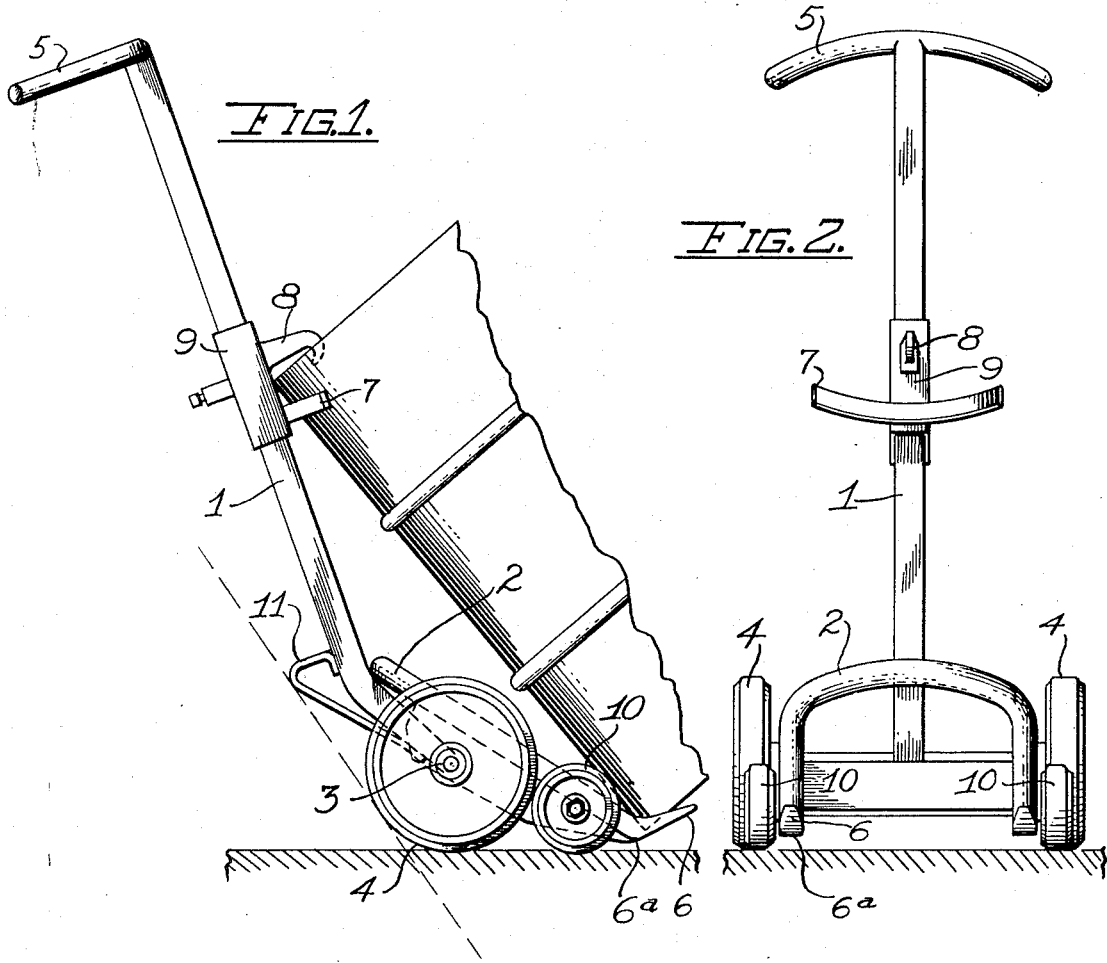
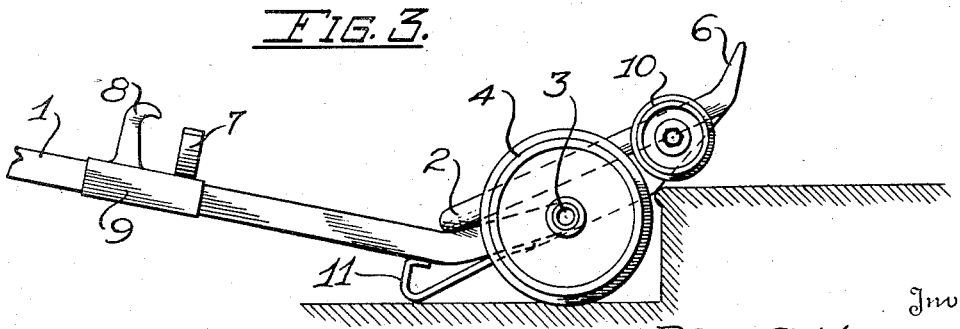
Inventor
ROE C. HAWKINS
By William C. Hall
Attorney Patented Sept. 25, 1945

2,385,514

UNITED STATES PATENT OFFICE 2,385,514

BARREL TRUCK

Roe C. Hawkins, Long Beach, Calif.

Application February 7, 1944, Serial No. 521,316

7 Claims. (Cl. 214—65.4)

My present invention relates to hand trucks, and more particularly to barrel trucks.

One of the principal objects of this invention is to provide improvements over my former invention for a Barrel truck, No. 2,150,503, issued March 14, 1939.

An important object of such improvements is to provide a barrel truck having barrel supporting arms and two pairs of truck conveying wheels, one for normally conveying the truck from place to place, and the other adjacent thereto and immediately behind the barrel supporting arms, to permit the ready mounting of the truck upon a barrel supporting platform or upon a step or steps.

Another important object of this invention is to provide a truck of this class which may be very readily shifted or tilted backwardly from a pick-up or loading position to rolling position on all of the wheels, for supporting, carrying, or readily transporting the load on all of the wheels, and in which the load may also be very easily shifted or tilted to a still further backwardly inclined position with the forward wheels free of the supporting floor or surface.

An important object also is to provide a truck of this class in which these operations may be easily reversed and the load easily discharged.

With these and other objects in view, as will appear hereinafter, I have devised a barrel truck having certain novel features of construction, combination, and arrangement of parts and portions, as will be hereinafter described in detail, and particularly set forth in the appended claims, reference being had to the accompanying drawing, and to the characters of reference thereon, which form a part of this application, in which:

Fig. 1 is a side elevational view of a barrel truck, embodying my invention, as the same appears when resting in an upright position with all of the wheels on the ground, floor, or other supporting surface;

Fig. 2 is a front elevational view thereof; and,

Fig. 3 is a fragmentary side view of the truck as it appears when climbing a step or a raised platform.

The body of my truck consists essentially of a single central post 1, having a wide frame 2 at its lower end. At the rear portion of the frame and at the lower end of the post is transversely mounted an axle 3, on the ends of which are mounted the truck conveying or transporting wheels 4. At the upper end of the post is provided a suitable handle bar 5.

The frame 2 is of inverted U-shape, and is provided at the lower end of its legs with forwardly extending barrel supporting arms 6. These arms are arranged to extend under the lower chime of a barrel when placing the barrel on the truck and they also serve to support the barrel on the truck when it is being transported.

Intermediate the ends of the post are provided a saddle 7, for embracing the upper portion of the barrel which is adapted to be supported against the post. A hook 8 is also provided intermediate the ends of the post for engaging the upper chime of the barrel when it rests in the saddle 7. The saddle 7 and hook 8 are here shown as carried on a slide 9 which is slidably mounted on the post 1.

At the outer sides of the lower portion of the frame 2 are other truck conveying or supporting wheels 10 which are positioned immediately behind the barrel supporting arms 6. The lower tread portions of the wheels 10 are preferably positioned only slightly beyond or below the plane passing through the lower tread portions of the wheels 4 and the lowermost or heel portions of the barrel supporting arms 6.

At the back side of the lower portion of the post 1, is a single rest 11 which is adapted to support the truck in a reclining position, approximately as shown in Fig. 3.

The wheels 4 and 10 are so arranged that when both sets rest on the floor or support the truck, the center of gravity of the barrel or other load falls within the points of contact of the wheels. The wheels are also of such a size that all of the wheels together serve as a self supporting truck which may be wheeled equally well forwardly and backwardly, and which may also be rotated or turned sharply.

The truck is also so balanced that it is extremely easy to shift or break the same to various inclined positions from the barrel or load pick-up position to the inclined transporting position, and back again to the load-discharge position, and further so constructed and balanced that the barrel or load may be discharged quickly and with a minimum of effort.

It will be noted that the rear ends or heels 6ª of the supporting arms 6 provide fixed shoulders or pivots for initially breaking the truck to a backwardly inclined position, i. e., about which the truck may be initially rocked or tilted backwardly before the wheels 10 may rest upon the supporting surface. These shoulders or pivots therefore lie below the plane passing through the tip of the supporting arms and the tread or traction portions of the wheels 10. In such construction the plane of the underside of the arms 6 pass below the tread portions of the wheels 10.

It will be further noted that the truck is tilted only through an angle of less than 20°, or approximately 15°, when shifted from a position in which it rests on the rear ends or heels 6a of the supporting arms and the wheels 10, to a position in which it rests on all wheels 10 and 4.

The wheels 4 and 10 are further so arranged that the truck may be easily manipulated to climb a barrel supporting platform, or a step or steps, as shown in Fig. 3. The handle end of the truck is lowered, allowing the forward wheels to be raised above or onto the raised platform. The handle end is then raised, and the truck moved forwardly until the rear wheels 4 also may rest or ride upon the same platform.

Though I have shown and described a particular construction, combination, and arrangement of parts and portions, I do not wish to be limited to the same, but desire to include in the scope of my invention the construction, combination and arrangement substantially as set forth in the appended claims.

I claim:

1. A truck of the class described, comprising a frame, a truck conveying wheel means adjacent and behind one end of the frame, supporting arms at said end of the frame and extending forwardly thereof, and a pair of truck conveying wheels positioned between the wheel means and said arms, the tread portions of the wheels extending slightly below the plane passing through the tread portion of the wheel means and the rear portions of the arms, the arrangement between the rear portions of the arms and the tread portion of the wheel means being such that the truck is tilted through an angle of less than 20° from a position, when resting on the rear portions of the arms and the wheels, to a position determined by the wheels and wheel means, the wheels and wheel means being so arranged that the truck may rest upon and be rolled over a floor simultaneously on both.

2. A truck of the class described, a wheel means, a single post extending upwardly from the wheel means, a handle bar on the upper end of the post, a pair of laterally spaced forwardly extending arms on the lower end of the post adapted to extend under the load to be carried, and a pair of truck conveying wheels positioned between the arms and the wheel means, the tread portions of the wheels extending slightly below the plane passing through the tread portion of the wheel means and the rear ends of the arms, the wheels and wheel means being so arranged that the truck may rest upon and be rolled over a floor simultaneously on both.

3. A truck of the class described, comprising an axle, a pair of wheels journaled on the axle, a single post secured at one end to the axle, a handle bar on the upper end of the post, a pair of laterally spaced forwardly extending arms on the lower end of the post adapted to extend under a barrel, and another pair of wheels positioned between the arms and the first wheels, the tread portions of the wheels of the second pair extending slightly below the plane passing through the tread portions of the first wheels and the rear portions of the arms, both pairs of wheels being so arranged that the truck may rest upon and be rolled over a floor simultaneously on both pairs of wheels.

4. A truck of the class described, comprising a frame, a truck conveying wheel means adjacent and behind one end of the frame, supporting arms at said end of the frame and extending forwardly thereof, and a pair of truck conveying wheels positioned between the wheel means and said arms, the tread portions of the wheels extending slightly below the plane passing through the tread portion of the first wheel means and the rear portions of the arms, the rear ends of the arms having pivoting heels lying below the tangent plane connecting the forward ends of the arms and the tread portions of the wheels positioned behind the arms, said heels being located immediately in front of the latter wheels.

5. A truck of the class described, comprising a frame, a pair of truck conveying wheels adjacent and behind one end of the frame, supporting arms at said end of the frame and extending forwardly thereof, and another pair of truck conveying wheels positioned between the first wheels and said arms, the tread portions of the wheels of the other pair extending slightly below the plane passing through the tread portions of the first wheels and the rear portions of the arms, the rear ends of the arms having pivoting heels lying below the tangent plane connecting the forward ends of the arms and the tread portions of the wheels positioned behind the arms, said heels being located immediately in front of the latter wheels.

6. A truck of the class described, comprising a frame, a truck conveying wheel means adjacent and behind one end of the frame, supporting arms at said end of the frame and extending forwardly thereof, and a pair of truck conveying wheels positioned between the wheel means and said arms, the tread portions of the wheels extending slightly below the plane passing through the tread portion of the first wheel means and the rear portions of the arms, the lower sides of the arms being flat and the plane thereof when extended being positioned below the tread portions of the wheels, the rear ends of the arms having pivoting heels lying below the tangent plane connecting the forward ends of the arms and the tread portions of the wheels positioned behind the arms, said heels being located immediately in front of the latter wheels, the forward ends of the arms, the heels of the arms, and the tread portions of the wheels and the wheel means lying in a continuous gradual curve for breaking the truck from a position in which the flat sides of the arms rest on a supporting surface, about the heels, the wheels, and the wheel means.

7. A truck of the class described, an axle having supporting wheels at the opposite ends, a post secured to and extending upwardly above the median portion of the axle, and a U-shaped frame member positioned forwardly of the post and above the axle, the connecting portion of the U-shaped frame member being secured to the post and the legs of the U-shaped member being secured to and above the axle adjacent the wheels, the portion of the post to which said connecting portion of the U-shaped member is secured being bent backwardly.

ROE C. HAWKINS.